United States Patent
Li et al.

(10) Patent No.: US 12,354,308 B2
(45) Date of Patent: Jul. 8, 2025

(54) BINOCULAR IMAGE MATCHING METHOD, DEVICE, AND STORAGE MEDIUM

(71) Applicant: Beijing Tusen Zhitu Technology Co., Ltd., Beijing (CN)

(72) Inventors: Hongyang Li, Beijing (CN); Zehao Huang, Beijing (CN); Naiyan Wang, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 397 days.

(21) Appl. No.: 17/816,394

(22) Filed: Jul. 29, 2022

(65) Prior Publication Data
US 2023/0035648 A1    Feb. 2, 2023

(30) Foreign Application Priority Data

Jul. 30, 2021 (CN) .......................... 202110873191.2

(51) Int. Cl.
*G06T 7/80* (2017.01)
*G06T 3/20* (2006.01)
(Continued)

(52) U.S. Cl.
CPC .................. *G06T 7/85* (2017.01); *G06T 3/20* (2013.01); *G06T 7/337* (2017.01); *G06T 7/593* (2017.01);
(Continued)

(58) Field of Classification Search
CPC .. G06T 7/85; G06T 3/20; G06T 7/337; G06T 7/593; G06T 7/73; G06T 2207/10012;
(Continued)

(56) References Cited

U.S. PATENT DOCUMENTS

| 11,842,321 B1* | 12/2023 | Zou | G06V 20/52 |
| 2016/0140700 A1* | 5/2016 | Park | G06T 5/77 |
| | | | 382/275 |

(Continued)

FOREIGN PATENT DOCUMENTS

| CN | 110765922 A | 2/2020 |
| CN | 110956616 A | 4/2020 |

(Continued)

OTHER PUBLICATIONS

European Search Report from corresponding EP Application No. 22186649, dated Jan. 10, 2023 (8 pages).

(Continued)

*Primary Examiner* — Amandeep Saini
*Assistant Examiner* — Andrew S Budisalich
(74) *Attorney, Agent, or Firm* — Perkins Coie LLP

(57) ABSTRACT

Embodiments of the present invention disclose a binocular image matching method, apparatus, device, and storage medium. The method comprises: performing target detection on a first image to obtain a first bounding box of a target in the first image; determining a second bounding box corresponding to the first bounding box in a second image; and obtaining a third bounding box of the target in the second image by regressing the second bounding box. The technical solutions realize accurate matching of targets in a binocular image without requiring performing target detection on both images in the binocular image, and then use a matching algorithm to match the targets detected in the two images, thereby greatly reducing the calculation overhead of target matching in the binocular image.

18 Claims, 7 Drawing Sheets

(51) Int. Cl.
  *G06T 7/33* (2017.01)
  *G06T 7/593* (2017.01)
  *G06T 7/73* (2017.01)
  *G06V 10/22* (2022.01)
  *G06V 10/764* (2022.01)
  *G06V 10/77* (2022.01)
  *G06V 10/82* (2022.01)

(52) U.S. Cl.
  CPC .............. *G06T 7/73* (2017.01); *G06V 10/225* (2022.01); *G06V 10/764* (2022.01); *G06V 10/7715* (2022.01); *G06V 10/82* (2022.01); *G06T 2207/10012* (2013.01); *G06T 2207/20084* (2013.01); *G06T 2207/20228* (2013.01); *G06V 2201/07* (2022.01)

(58) Field of Classification Search
  CPC ........... G06T 2207/20084; G06T 2207/20228; G06V 10/225; G06V 10/764; G06V 10/7715; G06V 10/82; G06V 2201/07
  See application file for complete search history.

(56) References Cited

U.S. PATENT DOCUMENTS

| | | | |
|---|---|---|---|
| 2018/0041747 A1* | 2/2018 | Zhou | G01C 11/12 |
| 2018/0357788 A1 | 12/2018 | Li et al. | |
| 2019/0096069 A1* | 3/2019 | Qian | G06T 7/248 |
| 2019/0102642 A1* | 4/2019 | Tanabe | H04N 13/239 |
| 2020/0051254 A1* | 2/2020 | Habibian | G06T 7/75 |
| 2021/0117704 A1 | 4/2021 | Yao et al. | |
| 2021/0133996 A1* | 5/2021 | Zhou | G06T 7/579 |
| 2022/0101490 A1* | 3/2022 | Bruder | G06T 19/006 |

FOREIGN PATENT DOCUMENTS

| | | |
|---|---|---|
| CN | 111239684 A | 6/2020 |
| CN | 111982058 A | 11/2020 |
| JP | 2021068240 A | 4/2021 |

OTHER PUBLICATIONS

Shen, et al. "Visual Object Tracking By Hierarchical Attention Siamese Network" IEEE Transactions On Cybernetics, vol. 50, No. 7 [Jul. 2020], pp. 3068-3080.

United Arab Emirates, Ministry of Economy, Substantive Examination Result for UAE Appl. No. P6001394/2022, mailed on Oct. 10, 2024, 8 pages.

* cited by examiner

BINOCULAR IMAGE MATCHING METHOD, DEVICE, AND STORAGE MEDIUM

CROSS-REFERENCE TO RELATED APPLICATION(S)

The present disclosure claims priority to Chinese Patent Application No. 202110873191.2, titled "BINOCULAR IMAGE MATCHING METHOD, APPARATUS, DEVICE, AND STORAGE MEDIUM," filed on Jul. 30, 2021, the content of which is incorporated herein by reference in its entirety.

TECHNICAL FIELD

Embodiments of the present invention relate to the technical field of image data processing, and more particularly to a binocular image matching method, device, and storage medium.

BACKGROUND

Target ranging is an extremely important part of unmanned driving systems. In order to ensure the accuracy of target ranging, the way of binocular ranging is usually used to detect a corresponding target from the binocular image, and then each target is matched in the binocular image to determine the position of the same target in the binocular image, so as to combine the internal and external parameters of the binocular camera to calculate the distance of the targets based on the disparity or triangulation.

At present, when target matching is performed on a binocular image, a corresponding matching algorithm is usually pre-designed to establish the corresponding relationship of the same target in the binocular image. At this time, the matching algorithm involves a variety of additional features, a variety of threshold values, fine parameter adjustment, etc. which makes the matching algorithm complex and has a certain matching error rate, greatly affecting the robustness and accuracy of target matching in the binocular image.

SUMMARY

In view of the above, embodiments of the present invention provide a binocular image matching method, apparatus, device, and storage medium to achieve accurate matching of targets within a binocular image and improve the accuracy and robustness of target matching within a binocular image.

In the first aspect, an embodiment of the present invention provides a binocular image matching method, comprising:
performing target detection on the first image of a binocular image to obtain a first bounding box of a target in the first image;
determining a second bounding box corresponding to the first bounding box in a second image of the binocular image;
and regressing a third bounding box of a target in the second image by using the second bounding box.

In a second aspect, embodiments of the present invention provide a binocular image matching apparatus, the apparatus comprising:
a target detection module for performing target detection on a first image to obtain a first bounding box of a target in the first image;
an area determination module for determining a second bounding box corresponding to the first bounding box in a second image of the binocular image;
and a regression module for regressing a third bounding box of a target in the second image by using the second bounding box.

In a third aspect, embodiments of the present invention provide an electronic device, comprising:
one or more processors;
and a storage apparatus for storing one or more programs;
wherein when one or more programs are executed by one or more processors, one or more processors are caused to implement the binocular image matching method according to any embodiment of the present invention.

In a fourth aspect, embodiments of the present invention provide a computer-readable storage medium having stored thereon a computer program which, when executed by a processor, implements the binocular image matching method in any embodiment of the present invention.

The embodiments of the present invention provide a binocular image matching method, apparatus, device, and storage medium. By performing target detection on the first image of a binocular image, the first bounding box of a target in the first image can be obtained, and at this time, the second bounding box corresponding to the first bounding box can be directly determined in the second image of the binocular image, and then the third bounding box of the target in the second image can be regressed by using the second bounding box, so as to realize the accurate matching of the target in the binocular image, without performing target detection on both images in the binocular image, and then a matching algorithm is used to match the targets detected in the two images; it greatly reduces the calculation overhead of target matching in the binocular image, solves the problem that the matching algorithm set by using various features and a threshold value in the prior art is relatively complex, avoids the limitation of target matching in the binocular image, and improves the efficiency, accuracy, and robustness of target matching in the binocular image.

DETAILED DESCRIPTION

Figure 1A:
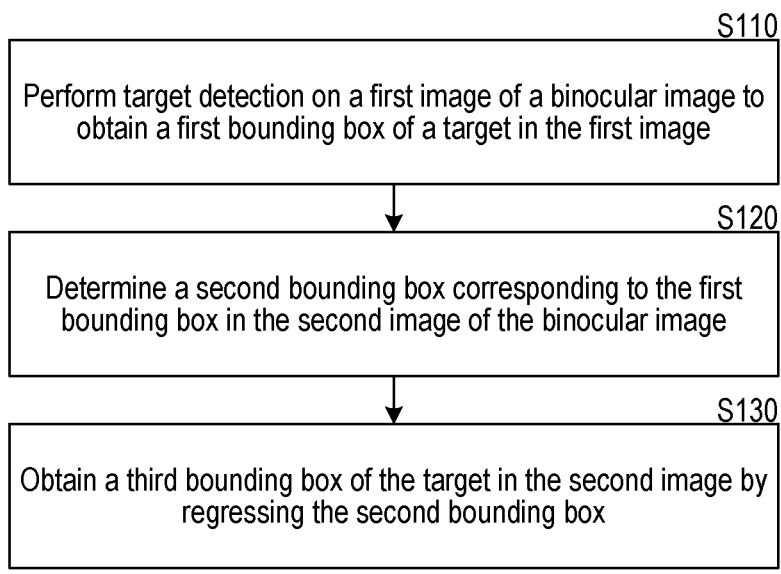
FIG. 1A is a flowchart of a binocular image matching method according to embodiment 1 of the present invention.

The present invention will now be described in further detail with reference to the accompanying drawings and embodiments. It could be understood that the particular embodiments described herein are illustrative only and are not restrictive of the present invention. It should also be noted that, for ease of description, only some, but not all, of the structures associated with the present invention are shown in the drawings. Further, embodiments of the invention and features of the embodiments may be combined with each other without conflicts.

Embodiment 1

FIG. 1A is a flowchart of a binocular image matching method according to embodiment 1 of the present invention. The embodiment is applicable to the case where the same target existing in two images of a binocular image is matched. A binocular image matching method provided by the present embodiment can be executed by a binocular image matching apparatus provided by an embodiment of the present invention. The apparatus can be realized by means of software and/or hardware and integrated in an electronic device for executing the method.

Specifically, referring to FIG. 1A, the method can include the steps:

S110, target detection is performed on a first image of a binocular image to obtain a first bounding box of a target in the first image.

Alternatively, when considering the binocular ranging, the same target in the binocular image needs to be matched. However, when two images of the binocular image are respectively subjected to target detection so as to use a set matching algorithm to match each target in the two images, there will be a large matching calculation overhead, resulting in the problem of inefficient matching.

Therefore, in order to solve the above-mentioned problem, the present embodiment can perform target detection on the first image of the binocular image to obtain the position information of each target in the first image. Further, in order to accurately mark each target in the first image, the present embodiment may use a bounding box (Bbox) mode to represent the position detection result of each target in the first image, i.e., a first bounding box of each target in the first image can be obtained. Then, the position information of the same target within the binocular image in the second image can be determined by analyzing the characteristics of the binocular camera for collecting the binocular image with reference to the first bounding box of each target in the first image, so as to realize target matching in the binocular image.

Of course, the present disclosure can also be applied to other multi-ocular images such as trinocular and tetra-ocular images. In this case, a binocular image is formed between any two binocular cameras, i.e., the position of the bounding box in other images can be determined according to the bounding box of any other image.

The first image in the present embodiment may be any one image of a left image and a right image of the binocular image, and the other image is a second image of the binocular image. The present embodiment is not limited as to whether the first image and the second image of the binocular image are the left image or right image. Further, the bounding box is a rectangular box for framing each target in the first image. The first bounding box in this embodiment can be represented as $\{Bbox_1^i\}_{i=1}^N$, where N is the number of targets detected in the first image and $Bbox_1^i$ represents the first bounding box of the $i^{th}$ target in the first image.

S120, a second bounding box corresponding to the first bounding box is determined in the second image of the binocular image.

Specifically, after detecting the first bounding box of each target in the first image of the binocular image, target detection is not performed on the second image of the binocular image in order to reduce the calculation overhead when targets in the binocular image are matching. Instead, a second bounding box corresponding to the first bounding box of each target is directly determined in the second image by taking the first bounding box of each target in the first image as a reference according to the internal and external parameters of the binocular camera, and the second bounding box can be represented as $\{Bbox_2^i\}_{i=1}^N$ to mark the position of each target in the second image after preliminary matching.

Figure 1B:
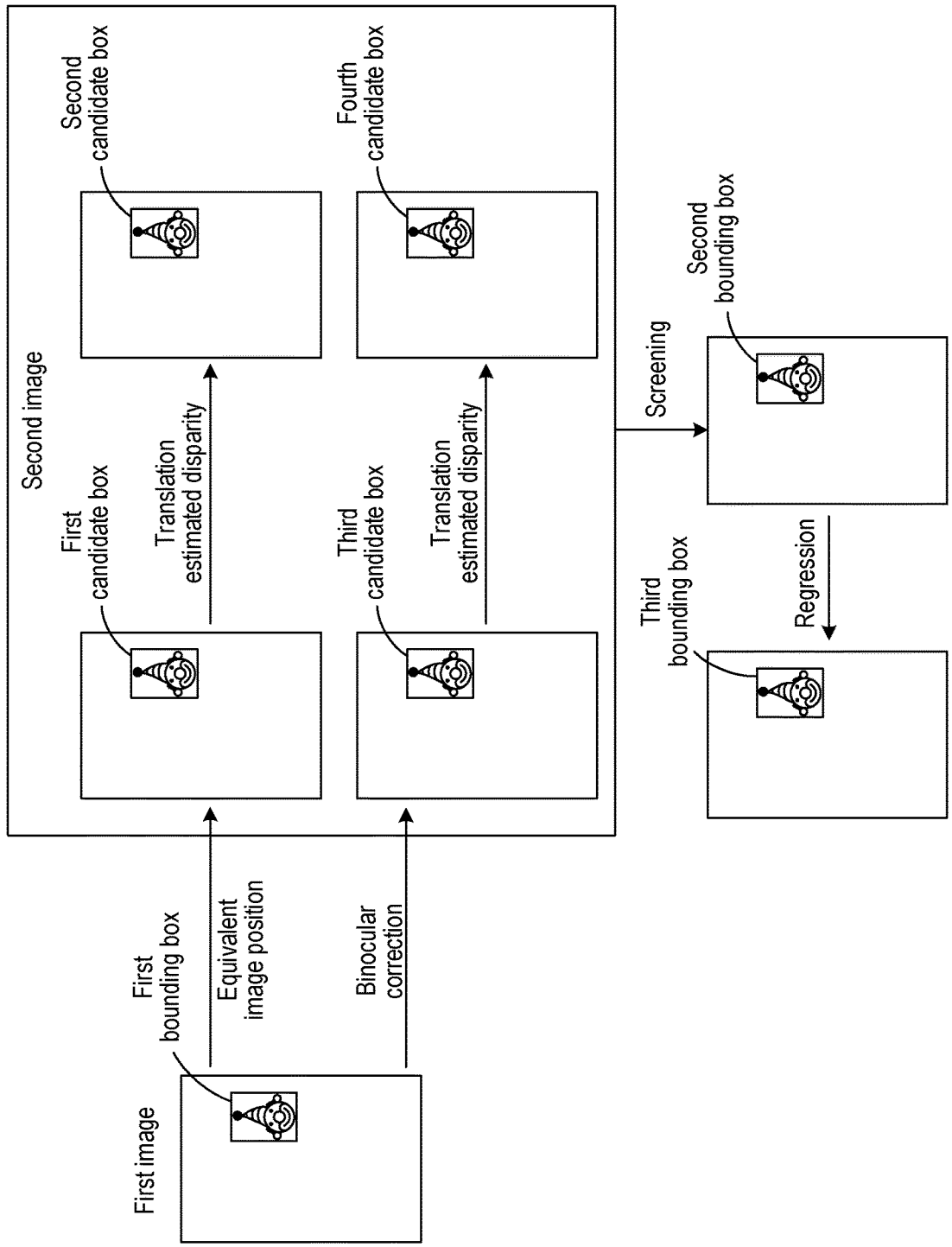
FIG. 1B is a schematic view of determining a second bounding box in a method according to embodiment 1 of the present invention.

Illustratively, as shown in FIG. 1B, the second bounding box in the present embodiment may be any one of the following candidate boxes:

1) a box with the same position within the image as the first bounding box is denoted as the first candidate box.

In the first case, when the imaging difference between the first image and the second image is small, it means that the positions of the same target in the first image and the second image are slightly different. Therefore, according to the coordinate positions of the first bounding box of each target in the first image, the present embodiment can directly determine a box at the same position as the first bounding box in the second image and denote it as the first candidate box. Then, considering that the imaging difference between the first image and the second image is small, the first candidate box may be taken as a second bounding box for each target within the second image.

Figure 1C:
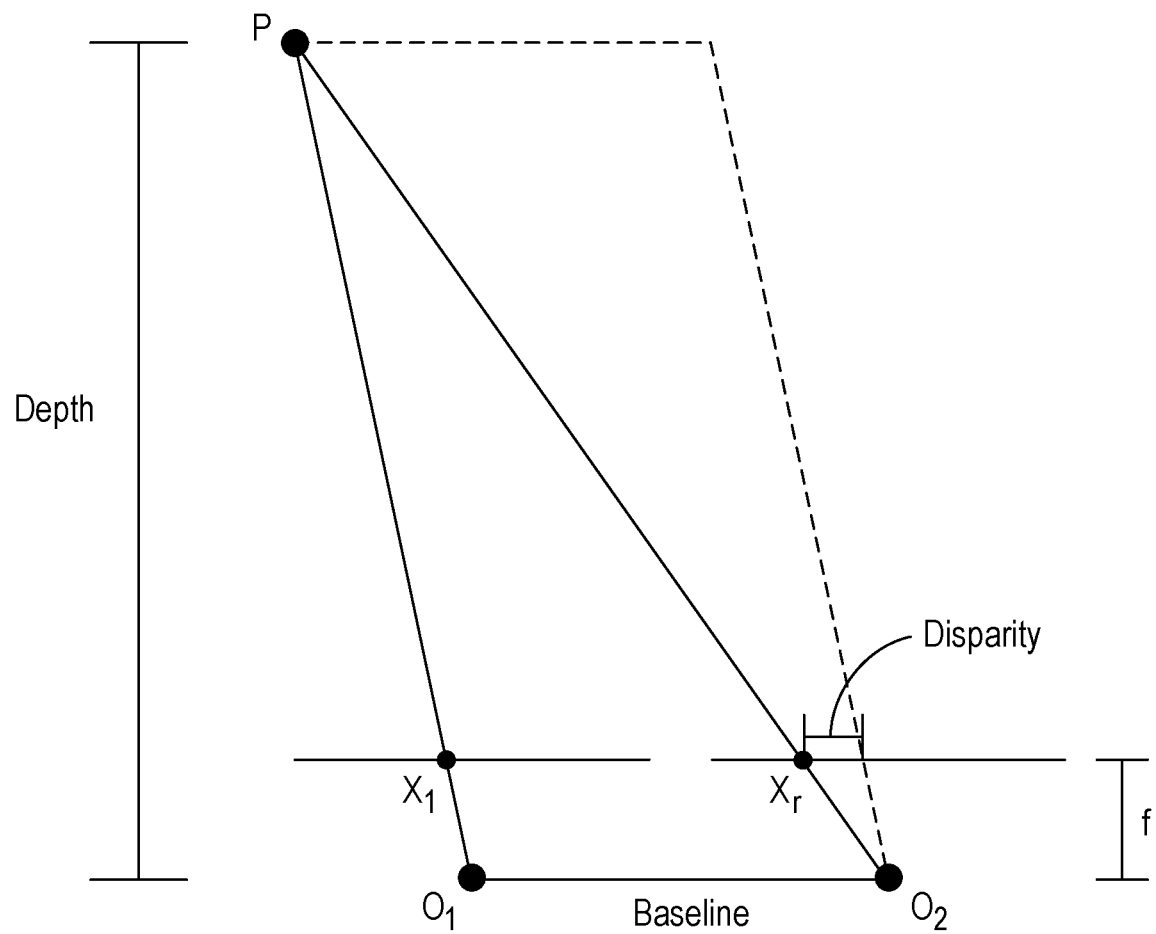
FIG. 1C is a schematic view showing the principle of imaging a target in a binocular camera in a method according to embodiment 1 of the present invention.

It needs to be noted that this embodiment can judge the imaging difference between the first image and the second image by using the disparity in the binocular image. The disparity is the imaging position difference of the target in the first image and the second image when the same target is photographed by a binocular camera. As shown in FIG. 1C, if point P is a photographed target, then $O_1$ and $O_2$ are two optical centers of a binocular camera, two line segments represent virtual imaging planes corresponding to the two optical centers in the binocular camera, f represents the focal length of the binocular camera, baseline represents the base length between the two optical centers of the binocular cameras, and depth represents the depth of the target point P. Accordingly, P, $O_1$, and $O_2$ may form a triangle, and the disparity of the point P on the virtual imaging planes corresponding to the two optical centers may be disparity=$x_l$-$x_r$, where $x_l$ is the position of the point P on the first virtual imaging plane and $x_r$ is the position of the point P on the second virtual imaging plane. Therefore, by using the principle of similar triangles, $$\frac{disparity}{f} = \frac{baseline}{depth}$$

can be obtained.

It is considered that the depths of the same target within the first image and the second image are the same. Therefore, it can be determined from the above formula that the disparity in the binocular image is affected by the baseline and focal length of the binocular camera used to collect the binocular image.

Therefore, the present embodiment can represent a case where the imaging difference between the first image and the second image is small by pre-setting a corresponding low disparity condition. Further, the present embodiment can acquire the information about the baseline and focal length of the binocular camera corresponding to the binocular image currently to be matched, and then judge whether the baseline and the focal length meet a preset low disparity condition, thereby determining whether the imaging difference between the first image and the second image is small. When the baseline and focal length comply with a pre-set low disparity condition, the first candidate box at the same position within the second image as the first bounding box in the first image can be taken as the second bounding box in the present embodiment, without any adjustment to the first bounding box, thereby ensuring the high efficiency of target matching in the binocular image. The low disparity condition, such as a baseline of the binocular camera being less than a first threshold value and/or a focal length being less than a second threshold value, is certainly not limited thereto, and a person skilled in the art can set a low disparity condition as required, and the present disclosure is not limited thereto.

2) A box obtained by translating the first bounding box an estimated disparity is denoted as a second candidate box.

In the second case, there will inevitably be a certain imaging difference between the first image and the second image, resulting in a certain difference in the positions of the same target. Also, as can be seen from FIG. 1C, the position difference of the same target within the binocular image can be represented by the disparity. Therefore, this embodiment can predict the disparity of the binocular image, and then translate the first bounding box in the second image according to the estimated disparity, so as to obtain the second bounding box of the same target in the second image. That is, the second bounding box in the present embodiment may be the second candidate box obtained by translating the first bounding box the estimated disparity in the second image to ensure the accuracy of target matching in the binocular image.

3) The box obtained after performing binocular correction of the first bounding box and projecting the same back to the uncorrected second image coordinate system is denoted as a third candidate box. The second image coordinate system may be the image coordinate system of the second image, preferably the pixel coordinate system of the second image. Certainly, it is not limited thereto. The image coordinate system takes the image center point as the original point, and the pixel coordinate system takes the vertex of the top left corner of the image as the original point.

In the third case, the above-mentioned matching of the first bounding box and the second bounding box for the same target in the binocular image is obtained with reference to an ideal binocular system. However, since some errors inevitably occur in the positions of the two optical centers in a binocular camera, an ideal binocular system is difficult to obtain. So binocular correction is required to achieve an approximately ideal binocular system. In the present embodiment, it is considered that the matching of the targets in the binocular image is obtained by transforming the bounding box of the target, and the transformation of other pixel points in the binocular image is not involved. Therefore, when a second bounding box of a target is determined in a second image, binocular correction can be performed on the first bounding box of the target, and then projection back to an uncorrected second image coordinate system can be performed. The correction of target matching in the binocular image can be achieved without performing binocular correction on each pixel point in the binocular image, which greatly reduces the correction overhead of the binocular image. Further, the second bounding box in the present embodiment can be a third candidate box obtained by performing binocular correction on the first bounding box and projecting the same back to the uncorrected second image coordinate system, so as to ensure the accuracy and efficiency of the target matching in the binocular image.

4) A box obtained by performing binocular correction and translating an estimated disparity on the first bounding box and projecting the same back to the uncorrected second image coordinate system is denoted as a fourth candidate box.

In the fourth case, the second case can be analyzed in combination with the third case, taking into account the inevitable imaging difference between the first image and the second image, and the problem of an ideal binocular system. That is to say, the box obtained after performing binocular correction and translating an estimated disparity on the first bounding box, and projecting the same back to the uncorrected second image coordinate system is denoted as a fourth candidate box so that the second bounding box in the present embodiment can be the fourth candidate box, further improving the accuracy of target matching in the binocular image. It will be appreciated by those skilled in the art that the translational estimated disparity may be prior to the binocular correction operation, may be subsequent to the binocular correction operation, may be prior to the projection operation, or may be subsequent to the projection operation. The present disclosure does not limit the position sequence of the translational operation. In addition, the uncorrected second image coordinate system mentioned in the present disclosure may either be the image coordinate system of the second image or the pixel coordinate system of the second image. It is not limited in this disclosure.

Based on this, step S120 may include: translating the first bounding box an estimated disparity, and obtaining a second bounding box at a corresponding position in the second image. Further, translating the first bounding box an estimated disparity, and obtaining a second bounding box at a corresponding position in the second image comprises: after binocular correction, translating the estimated disparity, and projecting back to the uncorrected second image coordinate system are performed on the first bounding box, obtaining the second bounding box at the corresponding position in the second image.

It should be noted that the binocular correction and projection operation executed in the present embodiment are all operations executed with respect to the bounding box, without executing any correction operation on the binocular image such that the process of adjusting each pixel point in the binocular image when correcting the binocular image is greatly omitted, thereby improving the target matching efficiency of the binocular image.

S130, a third bounding box of the target in the second image is regressed by using the second bounding box.

In this embodiment, since the same target in the first image and the second image may have a certain size difference after imaging, and the sizes of the second bounding box and the first bounding box are almost the same or not much different, it means that the second bounding box may not completely frame the corresponding target in the second image. Therefore, in order to ensure the accuracy of the target in the second image, after determining the second bounding box of the target in the second image, the second bounding box is subjected to regression based on the feature of the target in the second image to obtain the third bounding box of the target in the second image. The bounding box regression in this embodiment mainly analyzes a certain mapping relationship existing between the second bounding box and the actual feature of the target in the second image, and uses the mapping relationship to map the second bounding box, so that the obtained third bounding box is infinitely close to the real bounding box of the target, thereby achieving accurate matching of the target in the binocular image.

The matching mode of the target in the binocular image in this embodiment does not need to define the application scene and collecting mode of the binocular image, avoids the limitation of target matching in the binocular image, and improves the efficiency and robustness of target matching in the binocular image. In addition, the binocular ranging of the present disclosure is object-level, rather than pixel-level, and can directly give depth information of an object.

Further, the present embodiment, after obtaining a third bounding box of the target in the second image by regressing the second bounding box so as to achieve the accurate matching of the target in the binocular image, may further comprise: calculating an actual disparity of the target in the binocular image according to the first bounding box and the third bounding box; and according to the actual disparity, the baseline and focal length of the binocular camera corresponding to the binocular image, calculating the depth information of the target.

That is, after obtaining the first bounding box in the first image and the third bounding box in the second image of the same target in the binocular image, the coordinate difference between the first bounding box and the second bounding box can be calculated as the actual disparity of the target in the binocular image. Then, the actual disparity of the target in the binocular image, the baseline and focal length of the binocular camera corresponding to the binocular image can be substituted into the formula $$\frac{disparity}{f} = \frac{baseline}{depth}$$

so that the depth information of the target can be calculated, thereby achieving the target ranging in the binocular image.

In the technical solution provided in the present embodiment, by performing target detection on the first image of a binocular image, the first bounding box of a target in the first image can be obtained, and at this time, the second bounding box corresponding to the first bounding box can be directly determined in the second image of the binocular image, and then the third bounding box of the target in the second image can be obtained by regressing the second bounding box, so as to realize the accurate matching of the target in the binocular image, without performing target detection on both images of the binocular image, and then a matching algorithm is used to match the targets detected in the two images; it greatly reduces the calculation overhead of target matching in the binocular image, solves the problem that the matching algorithm using various features and a threshold value in the prior art is relatively complex, avoids the limitation of target matching in the binocular image, and improves the efficiency, accuracy, and robustness of target matching in the binocular image.

Embodiment 2

Figure 2A:
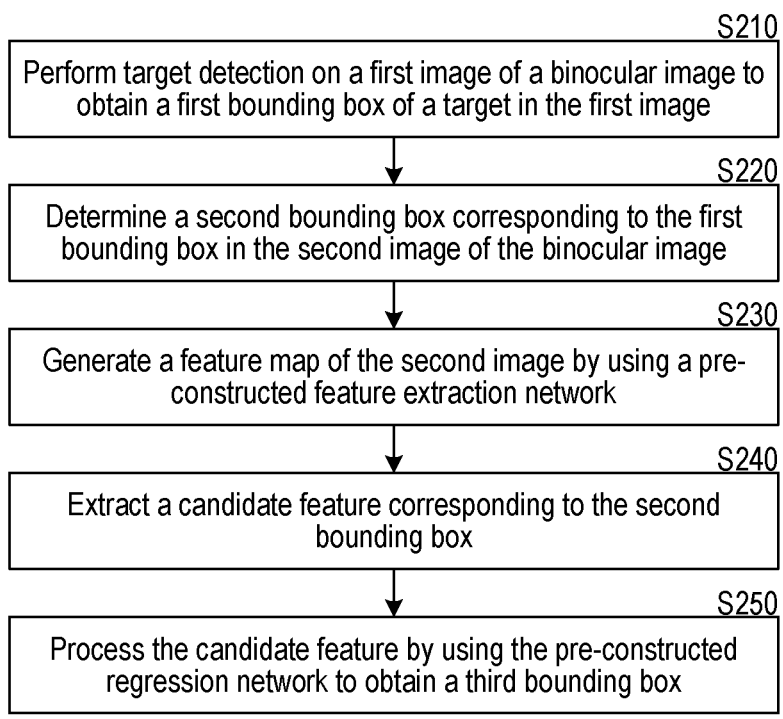
FIG. 2A is a flowchart of a binocular image matching method according to embodiment 2 of the present invention.

FIG. 2A is a flowchart of a binocular image matching method according to embodiment 2 of the present invention.

Figure 2B:
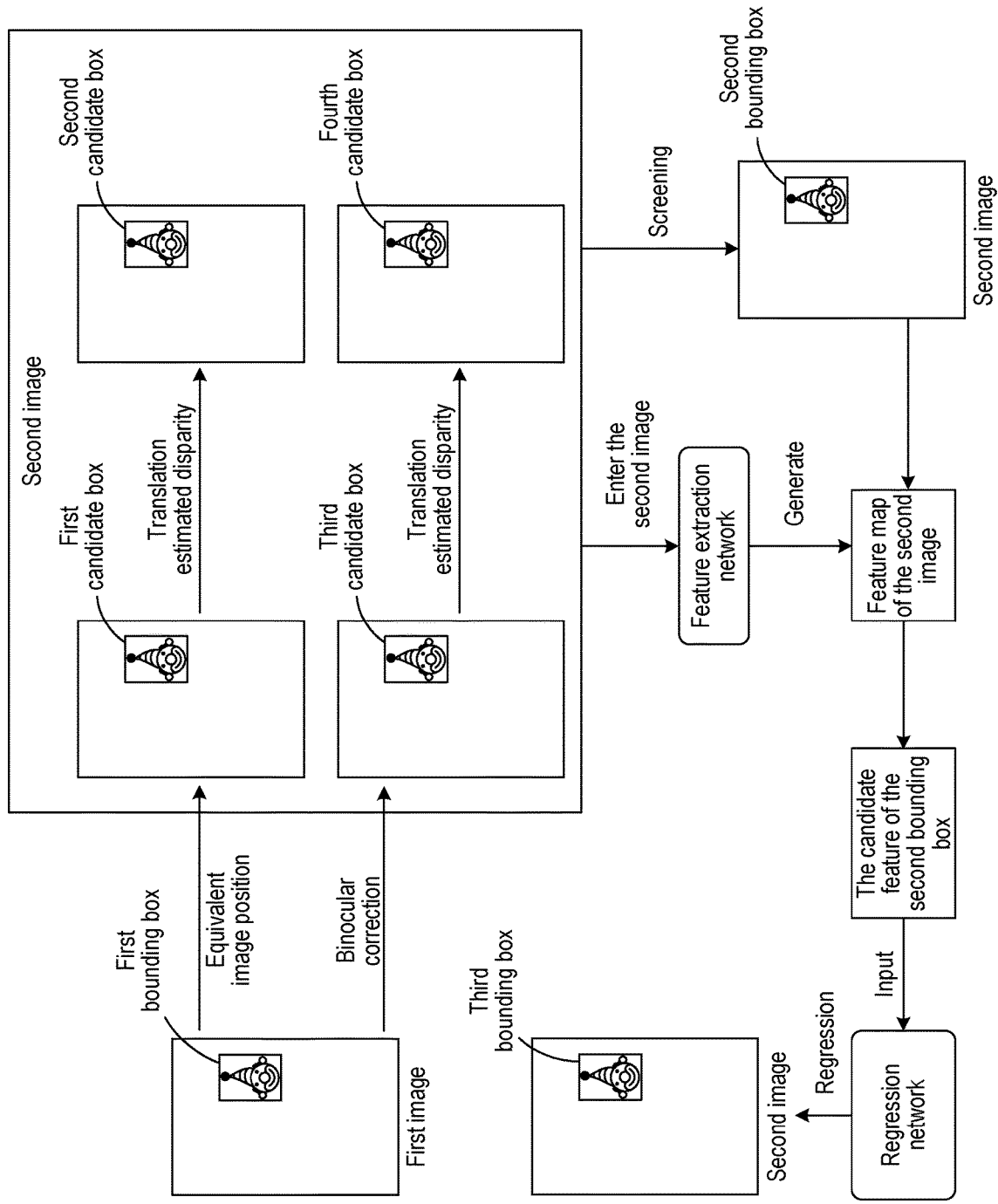
FIG. 2B is a schematic view showing the principle of a binocular image matching process according to embodiment 2 of the present invention.

FIG. 2B is a schematic view showing the principle of a binocular image matching process according to embodiment 2 of the present invention. The present embodiment is optimized on the basis of the above embodiment. Specifically, the present embodiment mainly explains in detail a specific regression process of the target from the second bounding box to the third bounding box within the second image.

Specifically, as shown in FIG. 2A, the present embodiment may include the following steps.

S210, target detection is performed on a first image of a binocular image to obtain a first bounding box of a target in the first image.

S220, a second bounding box corresponding to the first bounding box is determined in the second image of the binocular image.

S230, a feature map of the second image is generated by using a pre-constructed feature extraction network.

Alternatively, when the second bounding box of the target is regressed within the second image, some mapping relationship between the second bounding box and the actual features of the target within the second image needs to be analyzed, and therefore the target feature within the second image needs to be extracted.

In this embodiment, as shown in FIG. 2B, a corresponding feature extraction network is pre-constructed to input a second image into the feature extraction network. Then, the feature extraction network uses the trained network parameters to perform feature analysis on the second image input, so as to generate a feature map of the second image, thereby accurately analyzing the feature of each target in the second image.

S240, extracting a candidate feature corresponding to the second bounding box.

After obtaining the feature map of the second image, the relationship between the target and the feature map is analyzed according to a second bounding box of the target within the second image. Then, according to the relationship, the candidate feature corresponding to the second bounding box can be accurately extracted from the feature map as the target feature in the second image.

S250, processing the candidate feature by using the pre-constructed regression network to obtain a third bounding box.

Alternatively, in order to accurately regress the second bounding box, as shown in FIG. 2B, the present embodiment pre-constructs a regression network. The input of the regression network is a candidate feature of the second bounding box, and the output is a deviation amount of the second bounding box and the third bounding box; the deviation amount may include a size deviation amount of the bounding box and a coordinate deviation amount of the same key point within the bounding box, and the key point may include center points and/or diagonal vertices of the second bounding box and the third bounding box.

Illustratively, the deviation amount of the second bounding box and the third bounding box in the present embodiment may specifically include at least one of the followings: the width ratio (such as w3/w2), the height ratio (such as h3/h2), the ratio of the difference value of the abscissa of the key point to the width of the second bounding box (such as (x3−x2)/w2), and the ratio of the difference value of the vertical coordinate of the key point to the height of the second bounding box (such as (y3−y2)/h2) of the two bounding boxes. (x2, y2) is the coordinate of a certain key point in the second bounding box, (x3, y3) is the coordinate of a corresponding key point in the third bounding box, w2 and h2 are the width and height of the second bounding box, and w3 and h3 are the width and height of the third bounding box.

Of course, the bounding box can also be a three-dimensional box. In this case, the deviation amount can be, with regard to the two bounding boxes, the length ratio, the width ratio, the height ratio, the ratio of the difference value of the abscissa of the key point to the length of the second bounding box, the ratio of the difference value of the vertical coordinate of the key point to the width of the second bounding box, and the ratio of the difference value of the vertical coordinate of the key point to the height of the second bounding box. In addition, the present disclosure may also take the logarithm log as the size-dependent ratio quantity (i.e., length ratio, width ratio, height ratio) in order to reduce the effect of the size change of an object on the regression.

Therefore, after the candidate feature corresponding to the second bounding box is extracted, the candidate feature can be input into the regression network, and the candidate feature is subjected to regression processing through various trained network parameters in the regression network so as to output the deviation amount of the second bounding box and the third bounding box. Then, a third bounding box of the target in the second image can be obtained by adjusting the corresponding deviation of the second bounding box by using the deviation amount.

The technical solution provided in the present embodiment can directly output the deviation amount of the second bounding box and the third bounding box when the candidate feature of the second bounding box is subjected to regression processing via a pre-constructed regression network so that each difference between the second bounding box and the third bounding box can be quickly determined by using the deviation amount. When the difference parameter between the second bounding box and the third bounding box needs to be used to calculate other parameters, it can be directly obtained from the deviation amount, thereby improving the efficiency of determining the difference parameter during target matching in the binocular image.

Embodiment 3

Figure 3:
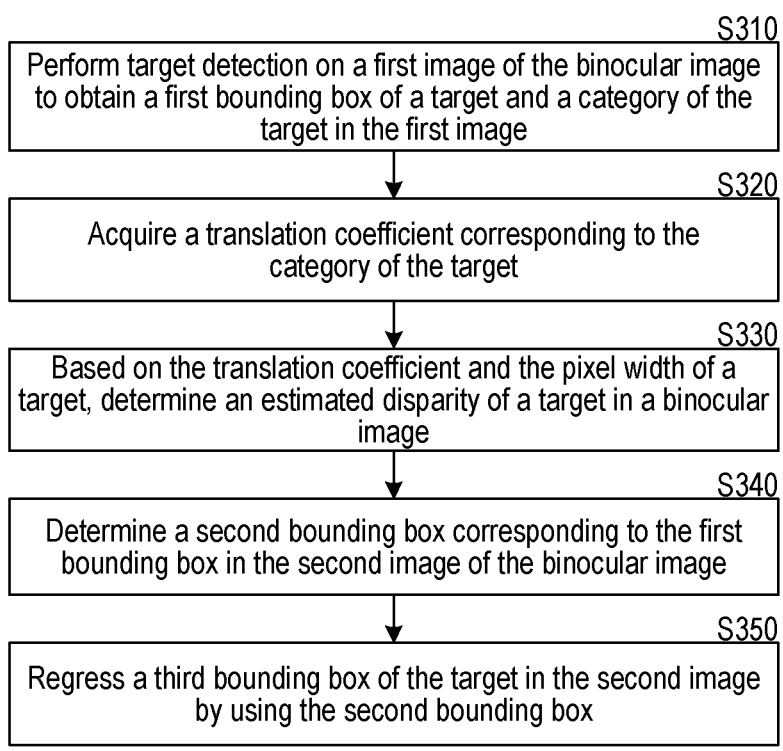
FIG. 3 is a flowchart of a binocular image matching method according to embodiment 3 of the present invention.

FIG. 3 is a flowchart of a binocular image matching method according to embodiment 3 of the present invention. The present embodiment is optimized on the basis of the above embodiment. Specifically, it is considered that the second bounding box may be any one of candidate boxes as follows: 1) a box at the same image position as the first bounding box is denoted as a first candidate box; 2) a box obtained after the first bounding box translates an estimated disparity is denoted as a second candidate box; 3) a box obtained after performing binocular correction on the first bounding box and projecting the same back to an uncorrected second image coordinate system is denoted as a third candidate box; 4) a box obtained after performing binocular correction, translating an estimated disparity on the first bounding box, and projecting the same back to the uncorrected second image coordinate system, is denoted as a fourth candidate box. However, when the second candidate box and the fourth candidate box are obtained, the first bounding box needs to be translated according to the estimated disparity; therefore, before the second bounding box corresponding to the first bounding box is determined in the second image of the binocular image, the estimated disparity of the target in the binocular image needs to be determined first. Accordingly, the present embodiment mainly explains in detail the specific calculation process of the estimated disparity of the target within the binocular image.

Specifically, referring to FIG. 3, the method may include the steps as follows.

S310, target detection is performed on a first image of the binocular image to obtain a first bounding box of a target and a category of the target in the first image.

Alternatively, the present embodiment may introduce the principle of monocular ranging in the binocular ranging to estimate the disparity of the binocular image, and the monocular ranging formula may be:

$$\frac{w}{f} = \frac{W}{\text{depth}};$$

wherein: w is the pixel width of the target, f is the focal length, W is the actual width of the target, and depth is the target depth. The formula for the binocular ranging is as mentioned in the embodiment 2:

$$\frac{\text{disparity}}{f} = \frac{\text{baseline}}{\text{depth}}.$$

Then, the above two formulas can be combined to obtain:

$$\text{disparity} = \frac{\text{baseline}}{W} w = kw;$$

wherein $$k = \frac{\text{baseline}}{W}$$

represents the translation coefficient of the first bounding box. It can be seen therefrom that the estimated disparity in this embodiment is related to the translation coefficient and the pixel width of the target. The width of a detection box can be taken as the pixel width of the target. Further, when the target is a vehicle body, the width of the vehicle body, such as the width of the vehicle tail or the width of the cross-section of the vehicle body, can be taken as the pixel width, and then the corresponding width of the target in the binocular image can be accurately extracted according to a specific algorithm.

Further, the translation coefficient is related to the actual width of the target and the baseline of the binocular camera, and the baseline can be predetermined. Considering that the actual width of each target under the same category is approximately the same, the translation coefficient can be an unknown but related quantity to the target category, and different target categories will set the corresponding translation coefficients.

Therefore, in order to determine the corresponding translation coefficient, in the present embodiment, when performing target detection on the first image, the category of each target in the first image is also detected so as to acquire the translation coefficient corresponding to the category of the target.

S320, acquiring a translation coefficient corresponding to the category of the target.

According to the preset corresponding relationship between the target category and the translation coefficient, after detecting the category of the target in the first image, the present embodiment can acquire the translation coefficient corresponding to the category of the target, so as to subsequently calculate the estimated disparity of the target in the second image according to the translation coefficient and the pixel width of the target.

It needs to be noted that for the correspondence between the target category and the translation coefficient, the present embodiment can analyze the relationship between the target category and the translation coefficient by using the pixel width and the actual disparity of each target under each category in a large number of historical binocular images. That is to say, the actual disparity and pixel width of the same target that has been marked as matching in the historical binocular image are determined; according to the marked pixel width and the actual disparity of each target under the same category, the translation coefficient corresponding to the category is calculated.

Specifically, the first bounding box of each target in the first image and the third bounding box of each target in the second image are accurately marked in the historical binocular image to accurately match the same target in the binocular image. Further, the first bounding box and the third bounding box marked in the historical binocular image are bounding boxes after image correction. Therefore, according to the first bounding box and the third bounding box of the same target that has been marked as matching in the historical binocular image, the actual disparity and pixel width of each target that has been marked as matching can be obtained. Then, the targets in the historical binocular image are categorized to obtain targets in each category. A person skilled in the art can set the categorization finesse of a large category or a small category of targets according to needs, and it is not limited in the present disclosure. Further, since the actual disparity and pixel width of multiple targets exist in each category, the historical translation coefficient of each target in each category is obtained accordingly. Further, mean value processing is performed on the historical translation coefficient of each target in each category, and the corresponding translation coefficient in the category can be obtained.

Illustratively, this embodiment may employ the formula:

$$k^i = \frac{1}{N_{object}^i} \sum_{j=1}^{N_{object}^i} \frac{disparity^i}{w^i}$$

to calculate a translation coefficient corresponding to each category. $k^i$ is the corresponding translation coefficient under the $i^{th}$ category, $N_{object}^i$ is the number of targets under the $i^{th}$ category, $disparity_j^i$ is the actual disparity of the $j^{th}$ target under the $i^{th}$ category, and $w_j^i$ is the pixel width of the $j^{th}$ target under the $i^{th}$ category.

In addition, considering that a corresponding baseline of the binocular camera can also be marked in the historical binocular image, and a corresponding baseline also exists in the binocular image to be matched currently, if different binocular cameras are used, the baseline in the translation coefficient will also be different. Therefore, in order to ensure the accuracy of the translation coefficient, this embodiment, when calculating the translation coefficient corresponding to the category according to the marked pixel width and the actual disparity of each target under the same category, also refers to the baseline of the binocular camera marked in the historical binocular image and divides the translation coefficient in this embodiment into two parts: the baseline and the sub-translation coefficient. According to the formula $$k = \frac{baseline}{W},$$

the actual width of the target under each category can be determined as the sub-translation coefficient in this embodiment. Then, according to the marked pixel width and actual disparity of each target under the same category and the corresponding baseline of the binocular camera, when calculating the sub-translation coefficient t corresponding to the category, the referenced calculation formula is:

$$t^i = \frac{1}{W^i} = \frac{1}{N_{object}^i} \sum_{j=1}^{N_{object}^i} \frac{disparity_j^i}{w_j^i} / baseline_j^i$$

$t^i$ is a sub-translation coefficient corresponding to the $i^{th}$ category; $baseline_j^i$ is a baseline of the binocular camera corresponding to the $j^{th}$ target in the $i^{th}$ category; and $W^i$ is the actual width of the $i^{th}$ category, and no actual statistics are performed for this parameter. The present disclosure, by means of a mean value statistical method, obtains value t (i.e., 1/W value) of different target categories under each category, and a baseline of the binocular camera in practical applications, i.e., a translation coefficient k of a binocular image to be matched can be obtained by a linear relationship.

Accordingly, after calculating the sub-translation coefficient corresponding to each target category, the translation coefficient corresponding to the category of the target can be determined based on the sub-translation coefficient and the baseline of the binocular camera corresponding to the binocular image currently to be matched. That is, the translation coefficients corresponding to the categories of targets in the second image are calculated by using the formula $$k = \frac{baseline}{W}.$$

S330, based on the translation coefficient and the pixel width of a target, an estimated disparity of a target in the binocular image is determined.

The pixel width of the target is determined according to the width of the first bounding box of the target. Then, the translation coefficient of the target in the second image and the pixel width of the target are substituted into the formula $$disparity = \frac{baseline}{W} w = kw,$$

and the estimated disparity of the target in the binocular image is calculated so that the first bounding box is translated accurately in the second image to ensure the accuracy of the second bounding box.

S340, a second bounding box corresponding to the first bounding box is determined in the second image of the binocular image.

S350, a third bounding box of the target in the second image is obtained by regressing the second bounding box.

In the technical solution provided in the present embodiment, by performing target detection on the first image of a binocular image, the first bounding box of a target in the first image can be obtained, and at this time, the second bounding box corresponding to the first bounding box can be directly determined in the second image of the binocular image, and then the third bounding box of the target in the second image can be obtained by regressing the second bounding box, so as to realize the accurate matching of the target in the binocular image, without performing target detection on both images in the binocular image, and then a matching algorithm is used to match the targets detected in the two images; it greatly reduces the calculation overhead of target matching in the binocular image, solves the problem that the matching algorithm set by using various features and a threshold value in the prior art is relatively complex, avoids the limitation of target matching in the binocular image, and improves the efficiency, accuracy, and robustness of target matching in the binocular image.

Embodiment 4

Figure 4:
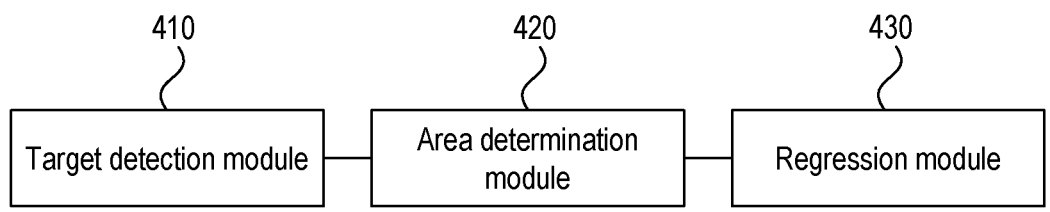
FIG. 4 is a schematic structural view of a binocular image matching apparatus according to embodiment 4 of the present invention.

FIG. 4 is a schematic structural view of a binocular image matching apparatus according to embodiment 4 of the present invention. As shown in FIG. 4, the apparatus may include:
a target detection module 410 for performing target detection on a first image to obtain a first bounding box of a target in the first image;
an area determination module 420 for determining a second bounding box corresponding to the first bounding box in a second image of the binocular image;
and a regression module 430 for obtaining a third bounding box of a target within the second image by regressing the second bounding box.

In the technical solution provided in the present embodiment, by performing target detection on the first image of a binocular image, the first bounding box of a target in the first image can be obtained, and at this time, the second bounding box corresponding to the first bounding box can be directly determined in the second image of the binocular image, and then the third bounding box of the target in the second image can be obtained by regressing the second bounding box, so as to realize the accurate matching of the target in the binocular image, without performing target detection on both images of the binocular image, and then a matching algorithm is used to match the targets detected in the two images; it greatly reduces the calculation overhead of target matching in the binocular image, solves the problem that the matching algorithm set by using various features and a threshold value in the prior art is relatively complex, avoids the limitation of target matching in the binocular image, and improves the efficiency, accuracy, and robustness of target matching in the binocular image.

Further, the second bounding box may be any one of the following candidate boxes.

A box with the same image position as the first bounding box is denoted as the first candidate box;
a box obtained by translating the first bounding box an estimated disparity is denoted as a second candidate box;
a box obtained after performing binocular correction of the first bounding box and projecting the same back to the uncorrected second image coordinate system is denoted as a third candidate box;
and a box obtained by performing binocular correction and translating an estimated disparity on the first bounding box and projecting the same back to the uncorrected second image coordinate system is denoted as a fourth candidate box.

Further, when the baseline and focal length of the binocular camera corresponding to the binocular image to be matched meet a pre-set low disparity condition, the second bounding box is the first candidate box.

Further, the regression module 430, described above, may be specifically used for:
generating a feature map of the second image by using a pre-constructed feature extraction network;
extracting a candidate feature corresponding to the second bounding box;
and processing the candidate feature by using the pre-constructed regression network to obtain a third bounding box.

Further, the input of the above-mentioned regression network is a candidate feature of the second bounding box, and the output is a deviation amount of the second bounding box and the third bounding box; the deviation amount includes the deviation amount of the size and coordinate deviation amount of a key point, and the key point includes a center point and/or a diagonal vertex.

Further, the deviation amount may include at least one of the followings:
with regard to the two bounding boxes, the width ratio, the height ratio, the ratio of the abscissa difference value of the key point to the width of the second bounding box, and the ratio of the vertical coordinate difference value of the key point to the height of the second bounding box.

Further, the result of the target detection may further include a category of the target, and the binocular image matching apparatus may further include: an estimated disparity calculation module;
the estimated disparity calculation module is used for acquiring a translation coefficient corresponding to the category of the target, and determining an estimated disparity of the target in the binocular image based on the translation coefficient and the pixel width of the target;
the pixel width of the target is determined according to the width of the first bounding box of the target.

Further, the binocular image matching apparatus may further include:
a historical parameter determination module for determining an actual disparity and a pixel width of the same target that has been marked as matching in the historical binocular image;
and a translation coefficient calculation module for calculating a translation coefficient corresponding to the category according to the marked pixel width and actual disparity of each target under the same category.

Further, a corresponding baseline of the binocular camera can also be marked in the above-mentioned historical binocular image, and the above-mentioned translation coefficient calculation module can be specifically used for:
calculating a sub-translation coefficient corresponding to the category according to the marked pixel width and actual disparity of each target under the same category and a corresponding baseline of the binocular camera;
wherein accordingly, the above-mentioned estimated disparity calculation module can be specifically used for:
determining a translation coefficient corresponding to a category of the target based on the sub-translation coefficient and a binocular camera baseline corresponding to a binocular image currently to be matched.

Further, the binocular image matching apparatus may further include:
an actual disparity calculation module for calculating the actual disparity of the target in the binocular image according to the first bounding box and the third bounding box;
and a target depth calculation module for calculating the depth information about the target according to the actual disparity, and a baseline and a focal length of the binocular camera corresponding to the binocular image.

The binocular image matching apparatus provided in the present embodiment can be applied to the binocular image matching method provided in any of the above-mentioned embodiments, with corresponding functions and advantageous effects.

Embodiment 5

Figure 5:
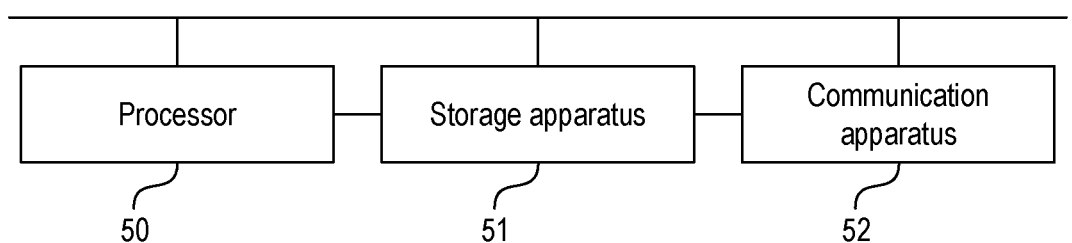
FIG. 5 is a schematic structural view of an electronic device according to embodiment 5 of the present invention.

FIG. 5 is a schematic structural view of an electronic device according to embodiment 5 of the present invention. As shown in FIG. 5, the electronic device comprises a processor 50, a storage apparatus 51, and a communication apparatus 52; the number of processors 50 in the electronic device can be one or more, and in FIG. 5, one processor 50 is taken as an example; the processor 50, the storage apparatus 51, and the communication apparatus 52 of the electronic device may be connected via a bus or in other ways, and the connection via a bus is taken as an example in FIG. 5.

The storage apparatus 51 is a computer-readable storage medium that can be used to store software programs, computer-executable programs and modules. The processor 50 executes various functional applications and data processing of the electronic device by running the software programs, instructions and modules stored in the storage apparatus 51, i.e., it implements the binocular image matching method described above.

The storage apparatus 51 may mainly comprise a program storage area and a data storage area. The program storage area may store an operation system and an application program required by at least one function; the data storage area may store data created according to the use of the terminal, etc. In addition, the storage apparatus 51 may include a high-speed Random Access Memory and may also include non-volatile storage, such as at least one disk storage device, a FLASH device, or other non-volatile solid-state storage devices. In some instances, the storage apparatus 51 may further include storage remotely provided with respect to the multi-function controller 50. The remote storage may be connected to the electronic device via a network. Instances of the above-mentioned network include, but are not limited to, the Internet, intranets, local area networks, mobile communication networks, and combinations thereof.

The communication apparatus 52 may be used to implement a network connection or a mobile data connection between the devices.

An electronic device provided by the present embodiment can be used to execute the binocular image matching method provided by any of the above-mentioned embodiments, with corresponding functions and advantageous effects.

Embodiment 6

Embodiment 6 of the present invention also provides a computer-readable storage medium having stored thereon a computer program which, when executed by a processor, can implement the binocular image matching method in any of the above embodiments. The method may comprise:
performing target detection on a first image of a binocular image to obtain a first bounding box of a target in the first image;
determining a second bounding box corresponding to the first bounding box in the second image of the binocular image;
and obtaining a third bounding box of a target within the second image by regressing the second bounding box.

Of course, an embodiment of the present invention provides a storage medium containing computer-executable instructions, which are not limited to the method operations as described above, but may also execute the related operations in the binocular image matching method provided by any embodiment of the present invention.

From the above description of implementation modes, it will be clear to a person skilled in the art that the present invention can be implemented by means of software and necessary general-purpose hardware, but of course also by means of hardware, the former being in many cases a better implementation mode. Based on such an understanding, the technical solutions of the present invention, in essence, or by the part that contributes to the prior art, can be embodied in the form of software products. The computer software products can be stored in a computer-readable storage medium, such as a floppy disk, a Read-Only Memory (ROM), a Random Access Memory (RAM), a FLASH, a hard disk or an optical disk, etc. and can include several instructions for causing a computer device (which can be a personal computer, a server, or a network device, etc.) to execute the method according to various embodiments of the present invention.

It should be noted that in the above-mentioned embodiments of the binocular image matching apparatus, each unit and module included therein is divided only according to functional logic, but is not limited to the above-mentioned division, as long as corresponding functions can be realized; in addition, the specific names of the functional units are merely for the convenience of mutual distinction and are not intended to limit the scope of the present invention.

It should be noted that the above are only preferred embodiments of the present invention and applied technical principles. It will be understood by those skilled in the art that the present invention is not limited to the particular embodiments described herein, and that various obvious changes, rearrangements, and substitutions can be made by those skilled in the art without departing from the scope of the invention. Therefore, although the present invention has been described in detail through the above embodiments, the present invention is not limited to the above embodiments, and can also include more other equivalent embodiments without departing from the concept of the present invention. Rather, the scope of the invention is determined by the scope of the appended claims.

EXAMPLE CLAUSES

Embodiments of the disclosure can be described in view of the following clauses:
1. A binocular image matching method, comprising: performing target detection on a first image of a binocular image to obtain a first bounding box of a target in the first image; determining a second bounding box corresponding to the first bounding box in a second image of the binocular image; and obtaining a third bounding box of a target in the second image by regressing the second bounding box.

2. The method according to clause 1, wherein the second bounding box is any one of candidate boxes as follows: a box with a same image position as the first bounding box is denoted as a first candidate box; a box obtained by translating the first bounding box an estimated disparity is denoted as a second candidate box; a box obtained by performing binocular correction of the first bounding box and projecting the corrected first bounding box back to an uncorrected second image coordinate system is denoted as a third candidate box; and a box obtained by performing binocular correction, translating the estimated disparity on the first bounding box and projecting the corrected and translated first bounding box back to the uncorrected second image coordinate system is denoted as a fourth candidate box.

3. The method according to clause 2, wherein the first candidate box is determined as the second bounding box when a baseline and focal length of a binocular camera corresponding to the binocular image to be matched meet a preset low disparity condition.

4. The method according to clause 1, wherein obtaining the third bounding box of the target in the second image by regressing the second bounding box comprises: generating a feature map of the second image by using a pre-constructed feature extraction network; extracting a candidate feature corresponding to the second bounding box; and processing the candidate feature by using a pre-constructed regression network to obtain a third bounding box.

5. The method according to clause 4, wherein an input of the regression network is the candidate feature corresponding to the second bounding box, and an output is a deviation amount of the second bounding box and the third bounding box; the deviation amount comprises the deviation amount of a size and coordinate deviation amount of a key point, and the key point comprises a center point and/or a diagonal vertex.

6. The method according to clause 5, wherein the deviation amount comprises at least one of: with regard to the second bounding box and the third bounding box, a width ratio, a height ratio, a ratio of abscissa difference value of the key point to a width of the second bounding box, or a ratio of vertical coordinate difference value of the key point to a height of the second bounding box.

7. The method according to clause 2, wherein a result of the target detection further comprises a category of the target, before determining a second bounding box corresponding to the first bounding box in the second image of the binocular image, the method further comprising: acquiring a translation coefficient corresponding to the category of the target; and determining the estimated disparity of the target in the binocular image based on the translation coefficient and a pixel width of the target; wherein the pixel width of the target is determined according to the width of the first bounding box of the target.

8. The method according to clause 7, before acquiring the translation coefficient corresponding to the category of the target, the method further comprising: determining an actual disparity and a pixel width of another target that has been marked as matching in a historical binocular image; and calculating a translation coefficient corresponding to the category according to the marked pixel width and the actual disparity of the another target under the category.

9. The method according to clause 8, wherein the historical binocular image is further marked with a corresponding baseline of the binocular camera, and a translation coefficient corresponding to the category is calculated according to the marked pixel width and actual disparity of the another target under the category, the method comprising: calculating a sub-translation coefficient corresponding to the category according to the marked pixel width and the marked actual disparity of the another target under the category and the corresponding baseline of the binocular camera; wherein the acquiring the translation coefficient corresponding to the category of the target comprises: determining the translation coefficient corresponding to the category of the another target based on the sub-translation coefficient and the baseline of a binocular camera corresponding to a binocular image currently to be matched.

10. The method according to clause 1, after obtaining a third bounding box of a target in the second image by regressing the second bounding box, the method further comprising: calculating an actual disparity of the target in the binocular image according to the first bounding box and the third bounding box; and calculating depth information about the target according to the actual disparity, a baseline and a focal length of a binocular camera corresponding to the binocular image.

11. A binocular image matching apparatus, comprising: a target detection module for performing target detection on a first image to obtain a first bounding box of a target in the first image; an area determination module for determining a second bounding box corresponding to the first bounding box in a second image of the binocular image; and a regression module for obtaining a third bounding box of a target in the second image by regressing the second bounding box.

12. An electronic device, wherein the electronic device comprises: one or more processors; and a memory for storing one or more programs; wherein when the one or more programs are executed by the one or more processors, the one or more processors are caused to implement the binocular image matching method according to any one of clauses 1-10.

13. A computer-readable storage medium having stored thereon a computer program which, when executed by a processor, implements the binocular image matching method according to any one of clauses 1-10.

What is claimed is:

1. A binocular image matching method, comprising:
performing target detection on a first image to obtain a first bounding box of a target in the first image;
determining a second bounding box corresponding to the first bounding box in a second image; and
obtaining a third bounding box of a target in the second image by regressing the second bounding box;
wherein the first image and the second image are captured by a left camera and a right camera of a binocular camera respectively;
wherein a result of the target detection further comprises a category of the target, the method further comprising:
acquiring a translation coefficient corresponding to the category of the target; and
determining the estimated disparity of the target in the first image and the second image based on the translation coefficient and a pixel width of the target;

wherein the pixel width of the target is determined according to the width of the first bounding box of the target.

2. The method according to claim 1, wherein the second bounding box is one of candidate boxes as follows:
a first candidate box, wherein the first candidate box is a box with a same image position as the first bounding box;
a second candidate box, wherein the second candidate box is a box obtained by translating the first bounding box an estimated disparity;
a third candidate box, wherein the third candidate box is a box obtained by performing binocular correction of the first bounding box and projecting the corrected first bounding box back to an uncorrected second image coordinate system; and
a fourth candidate box, wherein the fourth candidate box is a box obtained by performing binocular correction, translating the estimated disparity on the first bounding box and projecting the corrected and translated first bounding box back to the uncorrected second image coordinate system.

3. The method according to claim 2, wherein the first candidate box is determined as the second bounding box when a baseline and focal length of the binocular camera meet a preset low disparity condition.

4. The method according to claim 1, wherein obtaining the third bounding box of the target in the second image by regressing the second bounding box comprises:
generating a feature map of the second image by using a pre-constructed feature extraction network;
extracting a candidate feature corresponding to the second bounding box; and
processing the candidate feature by using a pre-constructed regression network to obtain a third bounding box.

5. The method according to claim 4, wherein an input of the regression network is the candidate feature corresponding to the second bounding box, and an output comprises a deviation amount of the second bounding box and the third bounding box; the deviation amount comprises the deviation amount of a size and coordinate deviation amount of a key point, and the key point comprises at least one of: a center point or a diagonal vertex.

6. The method according to claim 5, wherein the deviation amount comprises at least one of:
with regard to the second bounding box and the third bounding box, a width ratio, a height ratio, a ratio of abscissa difference value of the key point to a width of the second bounding box, or a ratio of vertical coordinate difference value of the key point to a height of the second bounding box.

7. The method according to claim 1, the method further comprising:
determining an disparity and a pixel width of another target that has been marked in historical images captured by the binocular camera; and
calculating a translation coefficient corresponding to the category according to the marked pixel width and the disparity of the another target under the category.

8. The method according to claim 7, wherein each of the historical images is further marked with a corresponding baseline of the binocular camera, and the calculating a translation coefficient corresponding to the category according to the marked pixel width and the disparity of the another target under the category comprises:
calculating a sub-translation coefficient corresponding to the category according to the marked pixel width and the marked disparity of the another target under the category and the corresponding baseline;
wherein the acquiring the translation coefficient corresponding to the category of the target comprises:
determining the translation coefficient corresponding to the category of the another target based on the sub-translation coefficient and the baseline of the binocular camera.

9. The method according to claim 1, the method further comprising:
calculating an disparity of the target in the first image and the second image according to the first bounding box and the third bounding box; and
calculating depth information about the target according to the disparity, a baseline and a focal length of the binocular camera.

10. An electronic device, wherein the electronic device comprises:
one or more processors;
and a memory for storing one or more programs;
wherein when the one or more programs are executed by the one or more processors, the one or more processors are caused to implement a binocular image matching method comprising:
performing target detection on a first image to obtain a first bounding box of a target in the first image;
determining a second bounding box corresponding to the first bounding box in a second image; and
obtaining a third bounding box of a target in the second image by regressing the second bounding box;
wherein the first image and the second image are captured by a left camera and a right camera of a binocular camera respectively;
wherein a result of the target detection further comprises a category of the target, the method further comprising:
acquiring a translation coefficient corresponding to the category of the target; and
determining the estimated disparity of the target in the first image and the second image based on the translation coefficient and a pixel width of the target;
wherein the pixel width of the target is determined according to the width of the first bounding box of the target.

11. The device according to claim 10, wherein the second bounding box is one of candidate boxes as follows:
a first candidate box, wherein the first candidate box is a box with a same image position as the first bounding box;
a second candidate box, wherein the second candidate box is a box obtained by translating the first bounding box an estimated disparity;
a third candidate box, wherein the third candidate box is a box obtained by performing binocular correction of the first bounding box and projecting the corrected first bounding box back to an uncorrected second image coordinate system; and
a fourth candidate box, wherein the fourth candidate box is a box obtained by performing binocular correction, translating the estimated disparity on the first bounding box and projecting the corrected and translated first bounding box back to the uncorrected second image coordinate system.

12. The device according to claim 11, wherein the first candidate box is determined as the second bounding box when a baseline and focal length of the binocular camera meet a preset low disparity condition.

13. The device according to claim 10, wherein obtaining the third bounding box of the target in the second image by regressing the second bounding box comprises:
generating a feature map of the second image by using a pre-constructed feature extraction network;
extracting a candidate feature corresponding to the second bounding box; and
processing the candidate feature by using a pre-constructed regression network to obtain a third bounding box;
wherein an input of the regression network is a candidate feature corresponding to the second bounding box, and an output comprises a deviation amount of the second bounding box and the third bounding box; the deviation amount comprises the deviation amount of a size and coordinate deviation amount of a key point, and the key point comprises at least one of: a center point or a diagonal vertex.

14. The device according to claim 10, wherein the method further includes:
determining an disparity and a pixel width of another target that has been marked in historical images captured by a binocular camera; and
calculating a translation coefficient corresponding to the category according to the marked pixel width and the disparity of the another target under the category.

15. The device according to claim 14, wherein each of the historical images is further marked with the corresponding baseline, and the calculating a translation coefficient corresponding to the category according to the marked pixel width and the disparity of the another target under the category comprises:
calculating a sub-translation coefficient corresponding to the category according to the marked pixel width and the marked disparity of the another target under the category and the corresponding baseline;
wherein the acquiring the translation coefficient corresponding to the category of the target comprises:
determining the translation coefficient corresponding to the category of the another target based on the sub-translation coefficient and the baseline of the binocular camera.

16. The device according to claim 10, wherein the method further includes:
calculating a disparity of the target in the first image and the second image according to the first bounding box and the third bounding box; and
calculating depth information about the target according to the disparity, a baseline and a focal length of the binocular camera.

17. A non-transitory computer-readable storage medium having stored thereon a computer program which, when executed by a processor, implements a binocular image matching method comprising:
performing target detection on a first image to obtain a first bounding box of a target in the first image;
determining a second bounding box corresponding to the first bounding box in a second image; and
obtaining a third bounding box of a target in the second image by regressing the second bounding box;
wherein the first image and the second image are captured by a left camera and a right camera of a binocular camera respectively;
wherein a result of the target detection further comprises a category of the target, the method further comprising:
acquiring a translation coefficient corresponding to the category of the target; and
determining the estimated disparity of the target in the first image and the second image based on the translation coefficient and a pixel width of the target;
wherein the pixel width of the target is determined according to the width of the first bounding box of the target.

18. The non-transitory computer-readable storage medium according to claim 17, wherein the second bounding box is any one of candidate boxes as follows:
a first candidate box, wherein the first candidate box is a box with a same image position as the first bounding box;
a second candidate box, wherein the second candidate box is a box obtained by translating the first bounding box an estimated disparity;
a third candidate box, wherein the third candidate box is a box obtained by performing binocular correction of the first bounding box and projecting the corrected first bounding box back to an uncorrected second image coordinate system; and
a fourth candidate box, wherein the fourth candidate box is a box obtained by performing binocular correction, translating the estimated disparity on the first bounding box and projecting the corrected and translated first bounding box back to the uncorrected second image coordinate system.

* * * * *